April 25, 1933.  E. R. MARBACH ET AL  1,905,926
METHOD OF MAKING STEERING WHEELS
Filed Sept. 5, 1930  3 Sheets-Sheet 1

Inventor
Edward R. Marbach
Gerald F. Cavanagh
Kivi Hudson Kent
Attorneys

April 25, 1933. E. R. MARBACH ET AL 1,905,926
METHOD OF MAKING STEERING WHEELS
Filed Sept. 5 1930  3 Sheets-Sheet 2
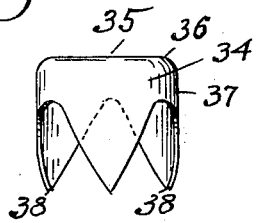
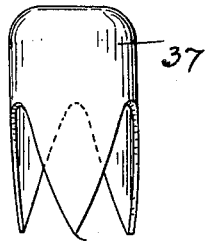
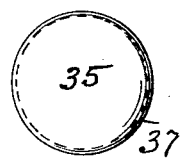
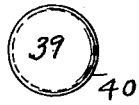
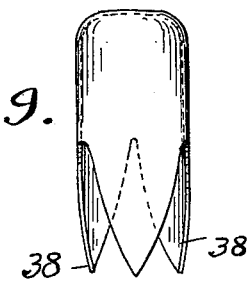
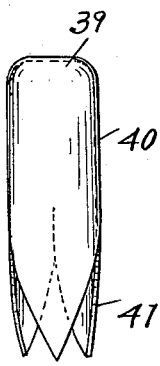
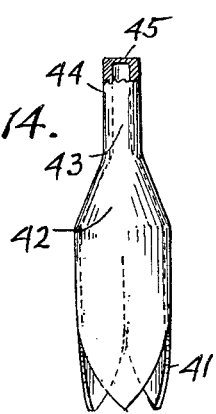
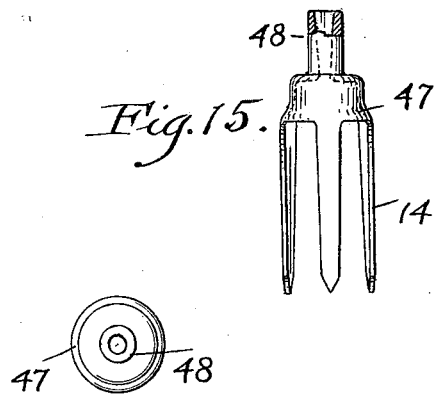

April 25, 1933. E. R. MARBACH ET AL 1,905,926
METHOD OF MAKING STEERING WHEELS
Filed Sept. 5, 1930 3 Sheets-Sheet 3

Inventor
Edward R. Marbach
Gerald F. Cavanagh.
Kwis Hudson & Kent
Attorneys

Patented Apr. 25, 1933

1,905,926

UNITED STATES PATENT OFFICE

EDWARD R. MARBACH AND GERALD F. CAVANAGH, OF CLEVELAND, OHIO, ASSIGNORS TO THE OHIO RUBBER COMPANY, OF CLEVELAND, OHIO, A CORPORATION OF OHIO

METHOD OF MAKING STEERING WHEELS

Application filed September 5, 1930. Serial No. 479,901.

This invention relates to steering wheels of the type comprising a metal insert having a hub, spokes, and rim, in which the greater part of the metal is covered with non-metallic material preferably hard rubber or composition.

It is an object of the present invention to form the spider of the insert from a blank which may be cut from sheet metal without leaving substantially any scrap.

Another object of the invention is to form the spider from a polygonal blank, whereby the corners of the blank may be formed into spoke portions.

Still another object of the invention is to provide a tubular or cup shaped blank having wedge shaped projections extending from the wall thereof, which may be formed into spoke portions of the spider.

A further object of the invention is to provide an integral spider having sheet metal spoke portions and a thickened hub portion.

Further objects are to simplify, economize and improve the construction and method of manufacture of devices of the character, to render the same adequate in strength and otherwise well adapted for the purpose set forth.

Other objects and features of novelty will be apparent as the following description proceeds, reference being had to the accompanying drawings, in which Figure 1 is a plan view of the completed metal insert according to the present invention, as covered with hard rubber.

Fig. 6 is an elevation of the blank after being cupped.

Fig. 7 is a plan view of the blank shown in Fig. 6.

Fig. 8 shows the blank after being further cupped.

Fig. 9 shows the blank after being still further cupped.

Fig. 10 shows the blank reduced to the desired diameter.

Fig. 11 is a plan view of the blank shown in Fig. 10.

Fig. 14 is also similar, showing the final contraction.

Fig. 15 is an elevation similar to Fig. 14 but showing the upset hub and the spokes trimmed before bending.

Fig. 16 is a plan view of the structure shown in Fig. 15.

Figure 1:
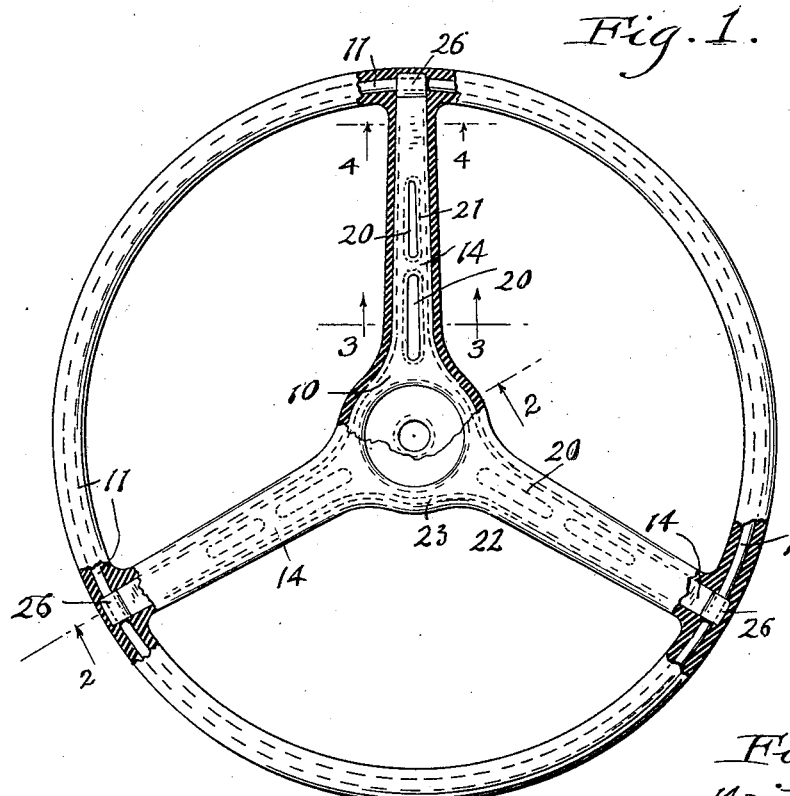

According to the present invention, sheet metal is cut in such a manner as to sever therefrom consecutive, equal blanks, without leaving any waste or scrap metal between the blanks. These blanks are necessarily non-circular, preferably polygonal, a triangular form being illustrated in the drawings. The blank is formed into a cup having wedge shaped projections extending from the wall thereof, preferably by drawing the corners of a polygonal blank so as to cause them to extend away from the cup to form spoke portions. The drawing operation may be so controlled as to give these spoke portions a taper toward the ends thereof, and to otherwise control their shape.

It is desirable to so shape the cup that the length of the cup and its projections is considerably greater than the diameter thereof. For this reason, while it is contemplated to form the desired cup in one operation, very satisfactory results may be obtained by successive operations tending to contract and simultaneously elongate the cup. In other words, the formation of the cup may be by pressing, stamping, rolling or swaging in one or more steps or combinations of these operations; but passing the cup through successive dies of decreasing diameter is preferred because this feature presents the least danger of rupture or irregularity in the metal, especially when a cold process is employed.

After such formation of the cup, the bottom thereof is contracted so as to simultaneously elongate and thicken the metal at the hub end of the blank, after which the elongated end is upset to shorten and still further thicken the hub end, and to form the desired cup between the hub portion and the spoke portions.

The wedge shaped projections are then spread to form substantially radially extending spoke portions. If necessary the spoke portions may be trimmed to the exact shape desired, either before or after the spreading step. A metal rim preferably a circular rod, is separately formed and positioned concentric with the hub portion, after which the ends of the spoke portions are secured thereto, preferably by rolling them over the rim in tight frictional engagement therewith, thus securing the spider to the rim.

From this brief summary it will be obvious that the novel method has great advantage in that scrap metal is practically entirely eliminated, an integral spider is provided, rivets and welds are avoided, and an insert is provided which is exceedingly well adapted for the purposes set forth.

Figure 2:
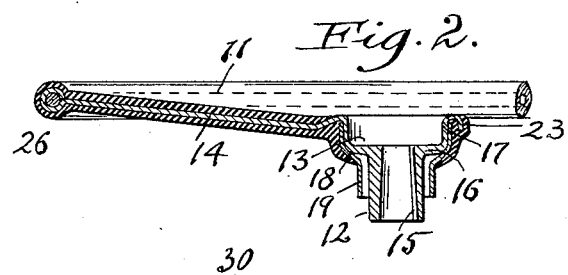
Fig. 2 is a vertical section taken along the line 2—2 of Fig. 1.
Figure 3:
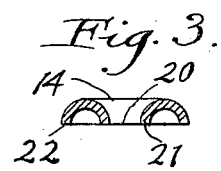
Fig. 3 is a section through one of the spokes shown in Fig. 1 taken along the line 3—3 thereof.
Figure 4:
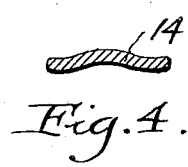
Fig. 4 is a view similar to Fig. 3 but taken along line 4—4 of Fig. 1.

Referring more particularly to the drawings, the completed insert is shown in Figs. 1 and 2, ready to be covered in whole or in part, by plastic composition, preferably rubber. A three spoke insert is shown as the preferred embodiment of the invention, but it is obvious that a greater or less number of spokes may be provided within the purview of the present invention. The insert comprises an integral spider 10 and a rim 11 which is a circular metallic element, preferably a rod of steel bent into a circle and joined at its ends, as by welding. The spider 10 comprises a hub portion 12 which is relatively thick, a cup portion 13 thereabove which is of intermediate thickness, and substantially radial sheet metal spokes 14. A keyway 15 is formed in the bore of the hub portion 12, preferably by broaching.

The cup portion 13 comprises a radial flange 16 and an annular flange 17. A sleeve 18 is pressed over the outside of the cup portion 13 and has a depending skirt portion 19 comprising an annular flange of a diameter intermediate that of the hub 12 and the flange 17. Apertures 20 are punched in the spokes, the punching being controlled to form depending stiffening flanges 21 surrounding the apertures. These apertures are of advantage in molding the plastic composition applied to the two sides thereof. The edges of the spokes are provided with flanges 22 which also strengthen the spokes. Intermediate the spokes, a depending flange 23 is formed which is continuous with the flanges 22 of the adjacent spokes.

The outer ends of the spokes may be secured to the rim 11 in any desired manner, as by welding or crimping. In the form shown the ends of the spokes are preferably flat, and rolled up around the rim 11 as at 26. If desired, the rim 11 may be roughened where the spokes are joined thereto, or after the roll 26 is formed the rim may be nicked to lift a burr which will prevent any lateral movement of the spokes.

Figure 5:
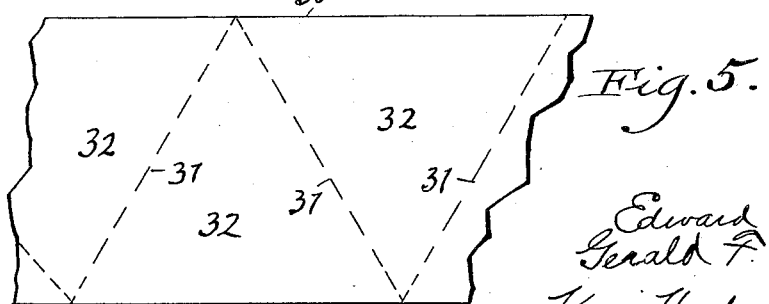
Fig. 5 is a diagram showing the manner in which a sheet of metal may be severed to form the blanks from which the inserts may be formed according to the present invention.

The blanks from which the spiders are formed are shown in Fig. 5. A strip of sheet metal, preferably steel is indicated at 30, which may be the product of a rolling mill producing a strip of this width, or it may be cut from a larger sheet. The dotted lines 31 indicate the cuts in the strip 30 which will sever therefrom triangular blanks 32. It is obvious that blanks in the form of any regular polygon of less than seven sides may be so laid out on a sheet of metal that they may be cut therefrom in any desired sequence without leaving any scrap metal therebetween. The triangular form shown, therefore, is not a limitation on the invention, but is merely employed to simplify the disclosure.

Describing now the operations according to the preferred method of manufacturing the insert, it being obvious that the invention is not limited to the exact operations or sequence recited, the triangular blank is inserted between dies to form a cup at the center of the blank and to draw the corners of the blank along the wall of the cup to form wedge shaped projections thereof. The blank after this first operation is shown in Fig. 6 as comprising a cup 34 having a flat bottom 35 smoothly rounded as at 36 into the wall 37 which is preferably of cylindrical contour. The corners of the blank form wedge shaped projections 38, which lie in the geometrical surface of revolution determined by the cylindrical wall 37.

The blank shown in Figs. 6 and 7 is then passed through dies of smaller diameter, which contract the wall 37 and at the same time elongate the wall and its projections 38 as shown in Fig. 8. Passing the blank through smaller dies results in the form shown in Fig. 9, and a final smaller set of dies results in the blanks shown in Figs. 10 and 11. The bottom 39 of this cup is materially smaller than the bottom 35 shown in Fig. 7, the metal thereof having drawn into the wall 40, and the wall 40 and the projections 41 are also much longer than the wall 37 and projections 38 shown in Fig. 9. However, the wall 40 is preferably maintained at a uniform thickness, and the projections 41 may be the same thickness, but if desired the drawing process may be so controlled as to taper the ends thereof.

Figure 12:
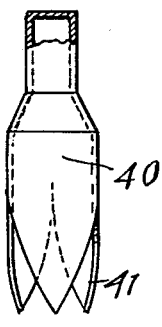
Fig. 12 shows the blank shown in Fig. 10 after the first stage of contracting the hub has been completed.
Figure 13:
Fig. 13 is similar to Fig. 12, showing further contraction.
Figure 18:
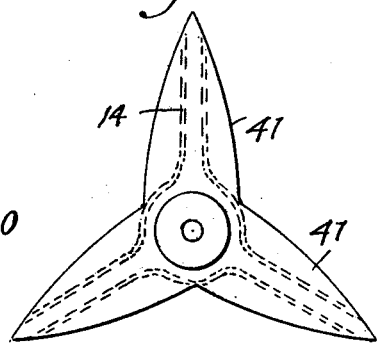
Fig. 18 is a plan of the structure shown in Fig. 17, showing the line of trimming by dotted lines.

The hub end of the blank shown in Figs. 10 and 11 is next formed into the desired thickened hub and cup portions, the bottom 39 and adjacent portions of the cup 40 being contracted to elongate and simultaneously thicken the metal as shown in Fig. 12. Further contraction and elongation results in the form shown in Fig. 13, and the final contraction is shown in Fig. 14. This operation forms a conical portion 42 and a tubular portion 43 having relatively thick walls 44 and a thin end wall 45, the metal being gradually thickened along the conical portion 42 and the tubular portion 43. The tubular portion 43 is quite thick, but of much decreased diameter.

The hub end of the blank shown in Fig. 14 is next upset to bring it into the form shown in Figs. 15 and 16. The intermediate tapered portion 42 is formed into a cup 47 and the tubular portion 44 is formed into a hub portion 48 which is shortened and further thickened by the upsetting step. The end of the portion 48 may be reamed out to leave a clean bore for the hub, at any time after the drawing operations are completed.

Figure 17:
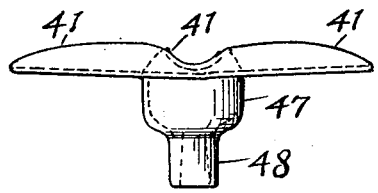
Fig. 17 is an elevation similar to Fig. 15, but showing the spoke portions bent before trimming.
Figure 21:
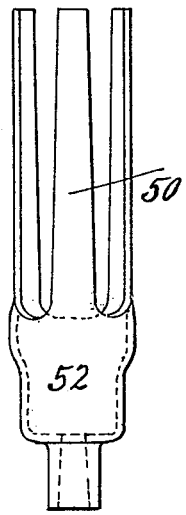
Fig. 21 is an elevation of the same, after having one end contracted and upset to form a hub.
Figure 20:
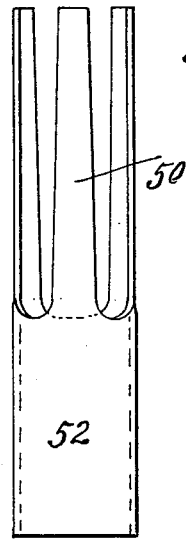
Fig. 20 is an elevation of one of the parts formed by cutting a tube as shown in Fig. 19.

The next step in the operation is alternative, to fold down the projections 41 and spread them substantially radially as shown in Fig. 17, before trimming the spokes, or the spokes may be trimmed as shown in Fig 15, before the spreading or bending of the spokes. The reenforcing flanges and apertures may be formed at this time by one or more stamping operations after which the separately formed rim 10 may be centered with the hub 11 and the ends of the spoke portions rolled around the rim to form the joints 26.

The keyway 15 is cut in the thickened hub portion 48, which completes the insert shown in Figs. 1 and 2, and plastic composition is then applied and hardened, preferably by vulcanization, to afford an insulating covering for the external parts of the wheel, and give the same a pleasing finish.

Figure 19:
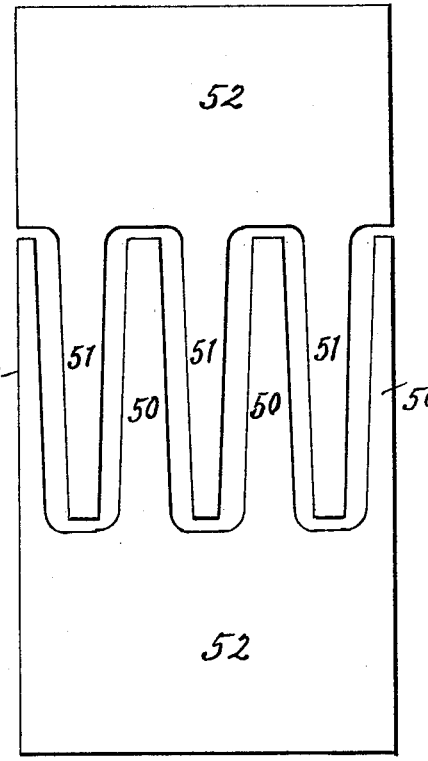
Fig. 19 is a development of a tube showing the same cut to form two spiders, as a modified embodiment.

A modified method of construction the spider is illustrated in Fig. 19, in which a length of metal tube is cut as shown to separate the same into two spider blanks. The metal between the spokes 50 of one spider is trimmed to form the spokes 51 of the other spider blank. The hub ends 52 of these blanks may be formed as described in connection with Figs. 12 to 15 inclusive, the spokes bent down, and the preformed rim secured in the same manner as hereinbefore described.

While embodiments of the invention have been illustrated and described in such detail as to enable any one skilled in the art to practice the invention, nevertheless it is to be understood that the invention is not to be limited to any of the details disclosed, other than as necessitated by the development of the prior art; but instead the invention embraces such embodiments of the broad idea as fall within the scope of the appended claims, it being obvious that various changes may be resorted to with respect to the disclosed embodiment without departing from the spirit of the invention.

Having thus described our invention, we claim:

1. The method of forming a spider for a steering wheel, which comprises, cupping a non-circular sheet metal blank having projections, and forming said projections into spoke portions.

2. The method of forming a spider for a steering wheel, which comprises, cupping a polygonal blank and forming spoke portions from the corners of the blank.

3. The method of manufacturing a spider for a steering wheel, which comprises, forming a triangular blank into a cup having three wedge shaped projections formed by the corners of the blank, and forming said projections into spoke portions.

4. The method of manufacturing a spider for a steering wheel, which comprises, forming a non-circular blank into a cup having projections from the wall thereof, contracting the bottom of said cup to form a hub portion, and spreading said projections to form spoke portions.

5. The method of forming a spider for a steering wheel, which comprises, cupping the central portion of a polygonal sheet metal blank, drawing the corners of said blank upward to form wedge shaped extensions of the wall of the cup, and bending said extensions downwardly and outwardly.

6. The method of manufacturing a spider for a steering wheel, which comprises, depressing the central portion of a polygonal sheet metal blank to form a cup, drawing the corners of said blank upward to form wedge shaped extensions of the wall of said cup, controlling the drawing to taper the thickness of said projections, and bending said projections downwardly and outwardly.

7. The method of manufacturing a spider for a steering wheel, which comprises, forming a non-circular sheet metal blank into a cup having projections from the wall thereof, forming said projections into spoke portions, separately forming a metal ring, positioning said ring concentric with said cup, and securing the ends of said spoke portions to said ring.

8. A blank for a steering wheel spider, comprising a cup having tapered projections extending from the wall thereof substantially in the direction of the axis of said cup, and a relatively thick walled hollow seamless hub portion integral and concentric with said cup portion.

In testimony whereof, we hereunto affix our signatures.

EDWARD R. MARBACH.
GERALD F. CAVANAGH.